United States Patent
Moegling et al.

(10) Patent No.: US 8,104,834 B2
(45) Date of Patent: Jan. 31, 2012

(54) AUTOMATIC SEAT CUSHION LOCKING MECHANISM WITH AUTOMATIC TIP-UP

(75) Inventors: Peter James Moegling, West Bloomfield, MI (US); Robert Joseph Hazlewood, Plymouth, MI (US); Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 282 days.

(21) Appl. No.: 12/430,263

(22) Filed: Apr. 27, 2009

(65) Prior Publication Data

US 2010/0270839 A1  Oct. 28, 2010

(51) Int. Cl.
*B60N 2/02* (2006.01)
(52) U.S. Cl. ...... 297/332; 297/316; 297/331; 297/378.1
(58) Field of Classification Search .......... 297/316, 297/326, 331, 332, 333, 335, 378.1, 378.12
See application file for complete search history.

(56) References Cited

U.S. PATENT DOCUMENTS

| | | | |
|---|---|---|---|
| 3,405,971 A | 10/1968 | Kobrehel | |
| 4,726,622 A * | 2/1988 | Palvolgyi | 297/378.12 |
| 4,925,229 A * | 5/1990 | Siebler | 296/65.09 |
| 5,158,338 A * | 10/1992 | Hayakawa et al. | 297/335 |
| 6,328,381 B1 | 12/2001 | Smuk | |
| 6,474,741 B2 * | 11/2002 | Kamida et al. | 297/378.12 |
| 6,739,668 B2 | 5/2004 | Coman et al. | |
| 6,832,815 B2 | 12/2004 | O'Connor | |
| 6,883,854 B2 * | 4/2005 | Daniel | 296/65.03 |
| 6,910,739 B2 | 6/2005 | Grable et al. | |
| 7,073,862 B2 * | 7/2006 | Lavoie | 297/378.13 |
| 7,152,925 B2 * | 12/2006 | Hur et al. | 297/378.13 |
| 7,374,242 B2 | 5/2008 | Champ et al. | |
| 7,547,070 B2 | 6/2009 | Nathan et al. | |
| 7,568,764 B2 * | 8/2009 | Harper et al. | 297/331 |

* cited by examiner

*Primary Examiner* — David Dunn
*Assistant Examiner* — Philip Gabler
(74) *Attorney, Agent, or Firm* — Gifford, Krass, Sprinkle, Anderson & Citkowski, P.C.

(57) ABSTRACT

A seat assembly for a motor vehicle which includes a locking mechanism is provided. The seat assembly has a base frame mounted to the floor of the vehicle. A seat cushion is pivotally mounted to the base frame for movement between a seated position and a stowed position. A locking mechanism operable to lock the seat cushion in the seated position is mounted to the base frame. The locking mechanism is capable of engaging the seat cushion at an intermediate position between the stowed position and the seated position. Upon engagement of the locking mechanism with the seat cushion at the intermediate position, movement of the seat cushion towards the stowed position is prevented while movement of the seat cushion towards the seated position is unimpeded.

17 Claims, 8 Drawing Sheets

AUTOMATIC SEAT CUSHION LOCKING MECHANISM WITH AUTOMATIC TIP-UP

FIELD OF THE INVENTION

The invention relates to a seat assembly for use in motor vehicles. More particularly, the invention relates to a seat assembly having a seat cushion and a locking mechanism configured to automatically lock the seat cushion as the seat cushion is moved towards a seated position.

BACKGROUND OF THE INVENTION

As vehicle seating capacity is a concern for consumers many vehicles now come equipped with a third row of passenger seating, such vehicles include sports utility vehicles (SUVs), minivans, full size and conversion vans. However, in order to reach the third row of passenger seating a passenger usually has to cross the second row of passenger seating to access a passageway which leads to the third row of passenger seating. As such, the seat assemblies which constitute the second row of passenger seating must be capable of alternating between a seated position and a stowed position (i.e. a walk-in position), to allow for easy access to the third row of passenger seating.

It is known to provide the seat cushion of the second row seat assemblies with a release handle which the passenger is required to actuate in order to move the seat cushion into either the tip-up (stowed) position or the seated position. The passenger must actuate a release handle and lift the seat cushion to place it in the stowed position. In order to move the seat cushion from the stowed position into the seated position, the passenger must actuate the release handle and move the seat back into the seated position.

In such a design the seat cushion is provided with a certain degree of looseness, i.e. until the seat cushion is locked into the seated position the seat cushion had a free range of motion towards both the stowed position and the seated position. The looseness of the seat cushion raised consumer concern regarding the quality of the seat assemblies, and other warranty issues. Accordingly, it is desirable to have a seat assembly which provides a passenger with a quick and easy ability to move the seat assembly from the seated position to the stowed position and which diminishes consumer concern over the quality of the seat assembly by eliminating the looseness of the seat cushion.

SUMMARY OF THE INVENTION

The present invention provides a seat assembly which overcomes the above-mentioned disadvantages of the previously known seat assembly designs.

In brief, a seat assembly for a motor vehicle which includes a locking mechanism is provided. The seat assembly has a base frame mounted to the floor of the vehicle. A seat cushion is pivotally mounted to the base frame for movement between a seated position and a stowed position. A locking mechanism operable to lock the seat cushion in the seated position is mounted to the base frame. The locking mechanism is capable of engaging the seat cushion at an intermediate position between the stowed position and the seated position. Upon engagement of the locking mechanism with the seat cushion at the intermediate position, movement of the seat cushion towards the stowed position is prevented while movement of the seat cushion towards the seated position is unimpeded. The locking mechanism includes a latch which is pivotally mounted to the base frame for movement between an engaged position and a disengaged position. The seat cushion is locked in the seated position when the latch is in the engaged position, and, consequently, the seat cushion is unlocked from the seated position when the latch is moved from the engaged position to the disengaged position.

The latch has an elongated slot dimensioned to receive a retention member which extends outwardly from the seat cushion. The latch has a guide edge which guides the retention member towards the elongated slot when the latch is in the engaged position and the seat cushion is moved from the stowed position towards the seated position. Upon engagement of the retention member with the elongated slot at the intermediate position, movement of the seat cushion towards the stowed position is prevented while movement of the seat cushion towards the seated position is unimpeded.

The seat assembly optionally includes a seat back pivotally mounted to the base frame for movement between a seated position and a stowed position. The seat back and the latch are operatively connected such that when the seat back is moved to the seated position the latch is in the engaged position, and when the seat back is moved to the stowed position the latch is in the disengaged position. As such, movement of the seat back from the seated position towards the stowed position moves the latch from the engaged position to the disengaged position thereby unlocking the seat cushion from the seated position. A spring attached to the seat cushion, which biases the seat cushion towards the stowed position, will automatically move the seat cushion from the seated position to the stowed position when the seat back is moved from the seated position to the stowed position as the latch moves from the engaged position to the disengaged position thereby unlocks the seat cushion.

DETAILED DESCRIPTION OF THE INVENTION

The present invention has utility as a seat assembly for use in a motor vehicle which overcomes the above-mentioned disadvantages. The inventive seat assembly provides a passenger with a quick and easy ability to move both the seat cushion and the seat back of the seat assembly from the seated position into the stowed position. Further, concerns over the quality of the seat assembly are diminished by eliminating the looseness of the seat cushion through limiting the range of motion of the seat cushion during movement of the seat cushion from a stowed position towards a seated position.

Referring to the FIGS., the inventive seat assembly for use in a motor vehicle is generally indicated at 10. The seat assembly 10 includes a base frame 12 which is mounted to the floor of the vehicle. The base frame 12 secures the seat assembly 10 to the vehicle, and can optionally be releasably mounted to the floor so that the seat assembly 10 may be removed entirely from the passenger compartment of the vehicle by releasing the base frame 12 from the floor.

Figure 1:
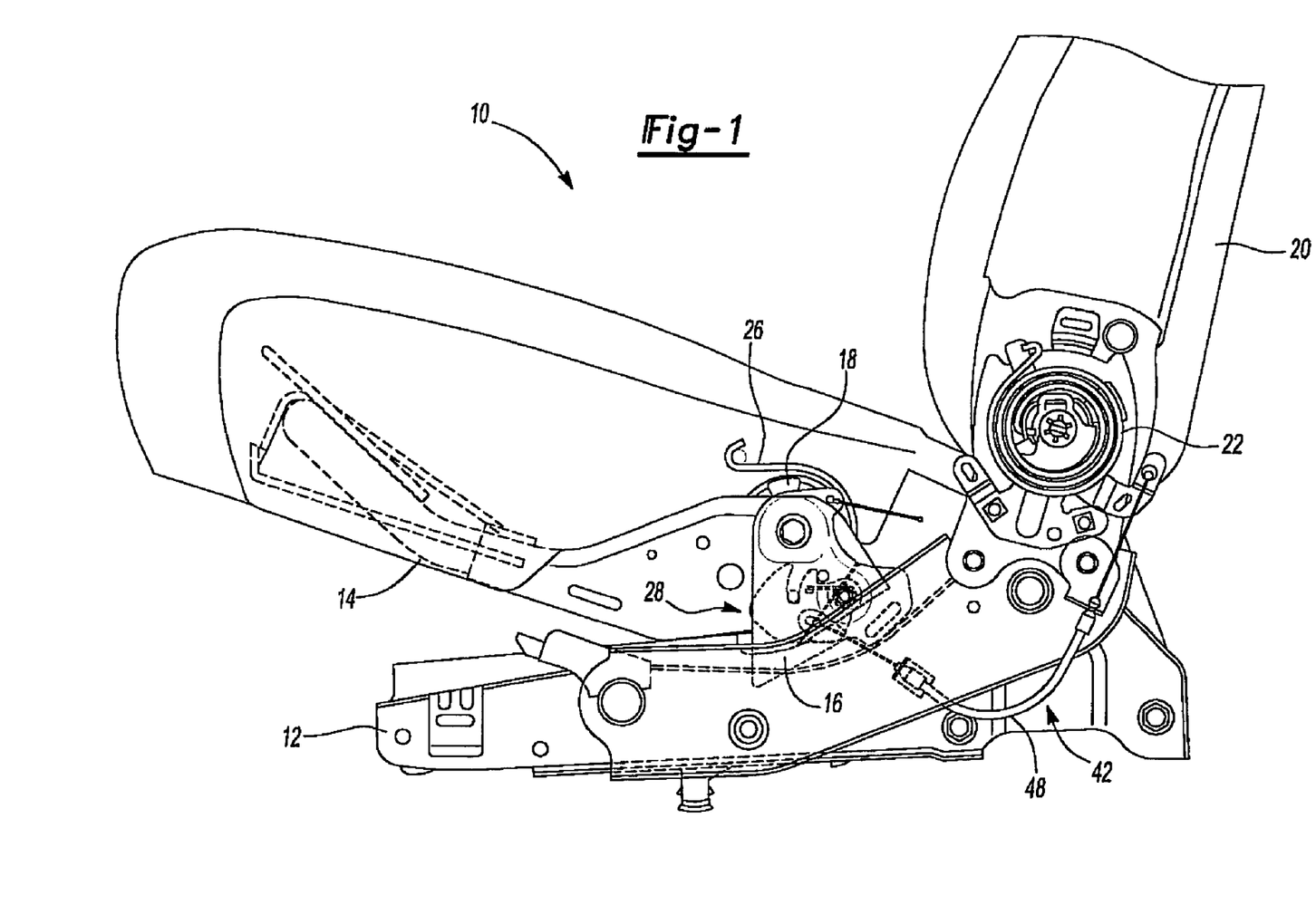
FIG. 1 is a side elevational view of the inventive seat assembly.
Figure 5:
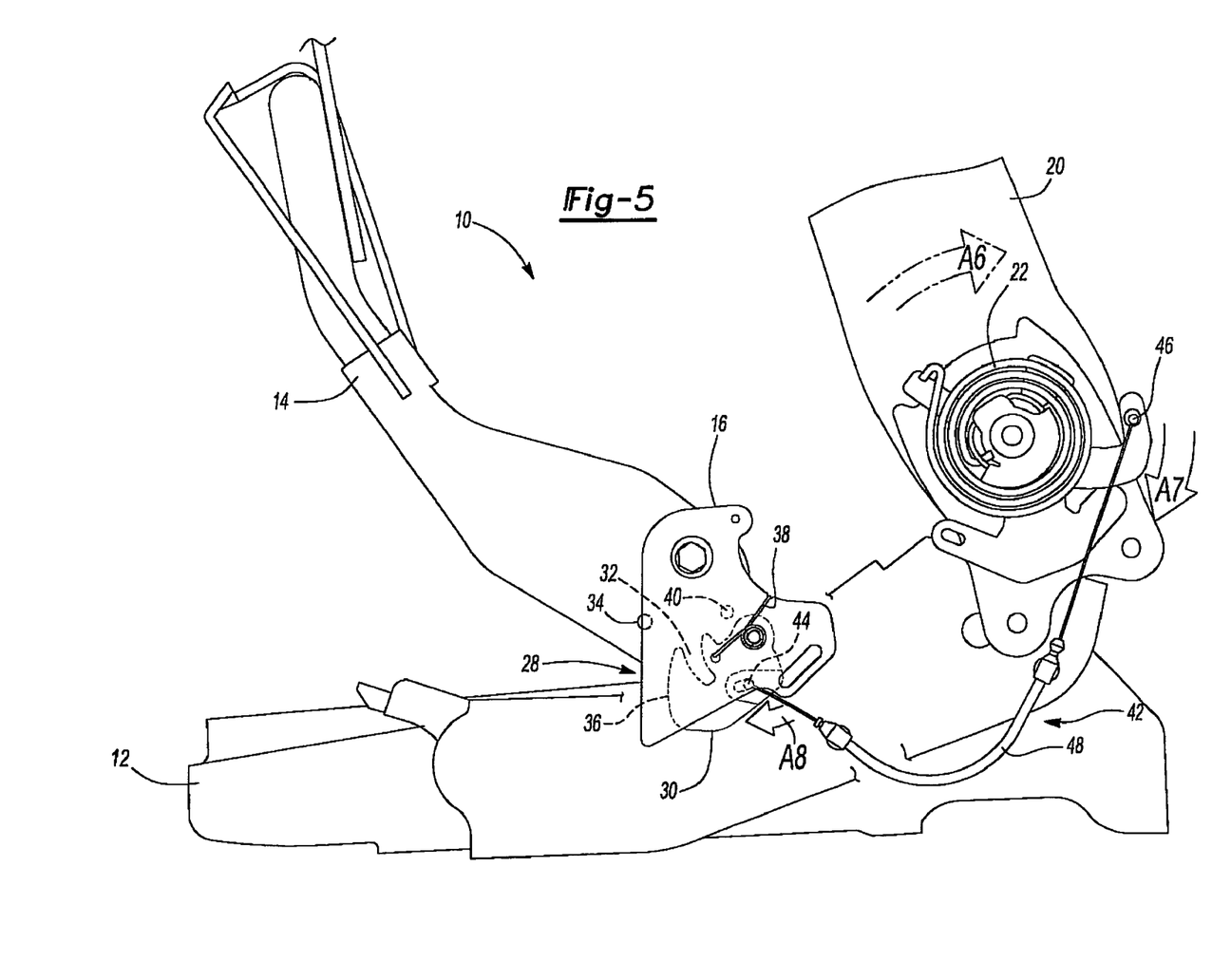
FIG. 5 is a side elevational view of the seat assembly showing the seat cushion in the stowed position, the seat back in the stowed position and the latch in the disengaged position.

A seat cushion 14 is pivotally mounted between a latch bracket 16 and a spring bracket 18 which are disposed opposite from each other on the base frame 12 to provide the seat cushion 14 with a pivot axis P1. The latch bracket 16 and the spring bracket 18, optionally, may be formed integrally with the base frame 12. The seat cushion 14 is selectively moveable, about pivot axis P1, for movement between a seated position, as seen in FIG. 1, and a stowed position, as seen in FIG. 5, and an intermediate position between the seated position and the stowed position, as best seen in FIG. 6B.

The seat assembly 10 further includes a seat back 20 pivotally mounted to the base frame 12. The seat back 20 is pivotally moveable about a second pivot axis P2 for selective movement between a seated position, as seen in FIG. 1, and a stowed position, as seen in FIG. 5. The seat back 20 includes a seat back biasing mechanism 22, such as a clock spring, which continuously biases the seat back 20 towards the stowed position. A seat back latch (not shown) releasably locks the seat back 20 in the seated position. A lever 24, depicted in FIG. 2, controls the seat back latch such that actuation of the lever 24 will disengage the seat back latch unlocking the seat back 20 from the seated position. As such, the seat cushion 14 is capable of automatic movement from the seated position to the stowed position upon being unlocked from the seated position.

The spring bracket 18 includes a seat cushion biasing mechanism 26, such as a clock spring, having a first end in the shape of a hook to engage a seat cushion spring tab. The seat cushion biasing mechanism 26 has a second end which is secured to the spring bracket 18 such that the seat cushion biasing mechanism 26 continuously biases the seat cushion 14 towards the stowed position. The torque of the seat cushion biasing mechanism 26 is calculated to be capable of lifting the seat cushion 14 from the seated position to the stowed position when the latch 30 is released, while remaining in the stowed position during normal driving condition, such as a rapid deceleration or downhill driving.

Figure 2:
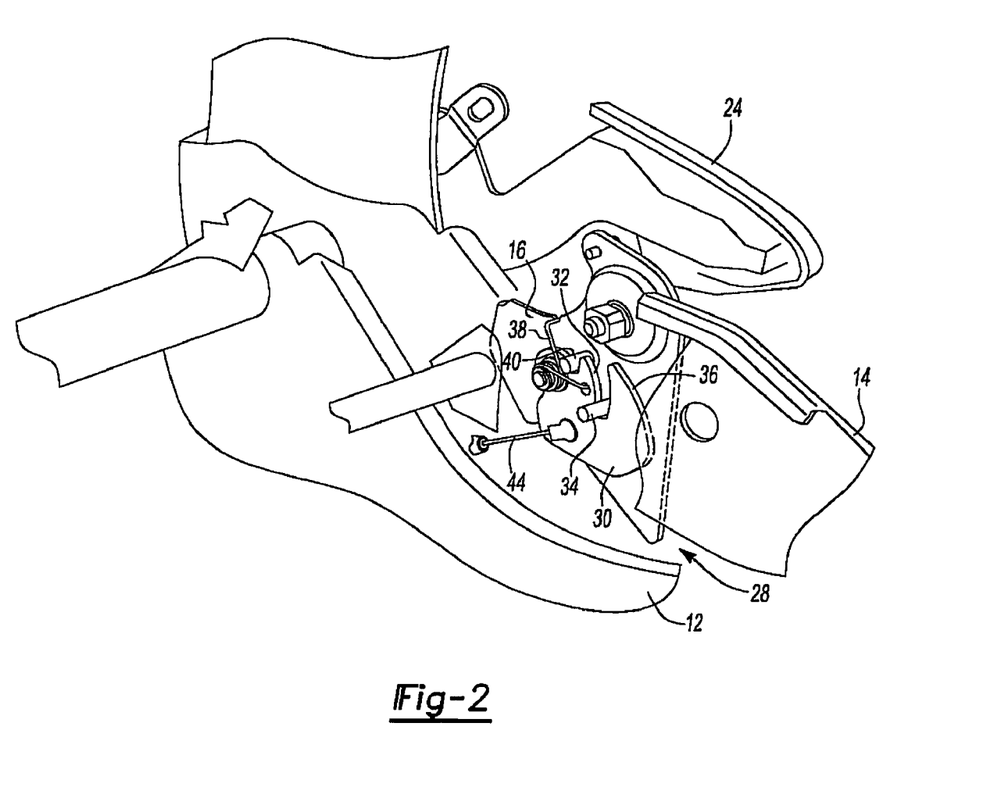
FIG. 2 is a partial perspective view of the locking mechanism of the seat assembly.

Referring now to FIG. 2, the latch bracket 16 houses the locking mechanism 28 of the seat assembly 10. The locking mechanism 28 is operable to lock the seat cushion 14 when the seat cushion 14 is in the seated position. Further, the locking mechanism 28 is capable of engaging the seat cushion 14 at an intermediate position between the seated position and the stowed position to prevent movement of the seat cushion 14 towards the stowed position, thereby eliminating seat cushion looseness, while movement of the seat cushion 14 towards the seated position is unimpeded.

The locking mechanism includes a latch 30 which is pivotally mounted to the latch bracket 16, between the latch bracket 16 and the seat cushion 14, for movement between an engaged position and a disengaged position. The latch 30 includes an elongated slot 32 extending from the exterior of the latch 30 towards the interior of the latch 30. The elongated slot 32 has an arcuate shape due to walls of the latch 30 which define the elongated slot having complementary cam angles, ranging from about 3° to about 6°, preferably 5.7°.

The elongated slot 32 is dimensioned to receive a retention member 34, illustratively including a pin, tab or other such suitable protrusions, which extends outwardly from the corresponding side of the seat cushion 14 to a point between the latch 30 and the latch bracket 16. The cam angle allows for the elongated slot to engage the retention member 34 having a diameter or width ranging from about 3.5 mm to about 8 mm, preferably 6 mm.

The latch 30 has an angled exterior side known as a guide edge 36 which guides the retention member 34 into the elongated slot 32. The interaction of the retention member 34 and the elongated slot and the guide edge 36 will be discussed in greater detail below.

A latch biasing mechanism 38, such as a coil spring, biases the latch 30 towards the engaged position. One end of the latch biasing mechanism 38 is secured to the latch 30 and the other is secured to the latch bracket 16 such that the latch 30 is continuously biased towards the engaged position. A stop member 40 extends outwardly from the latch bracket 16 to prevent movement of the latch 30 beyond the engaged position.

The seat back 20 and the latch 30 are interconnected by a cable 42, such as Bowden cable, having a latch end 44 attached to the latch 30 and a seat back end 46 attached to the seat back 20. The cable 42 includes a housing 48 having two opposite ends which are attached to the base frame 12.

Figure 3:
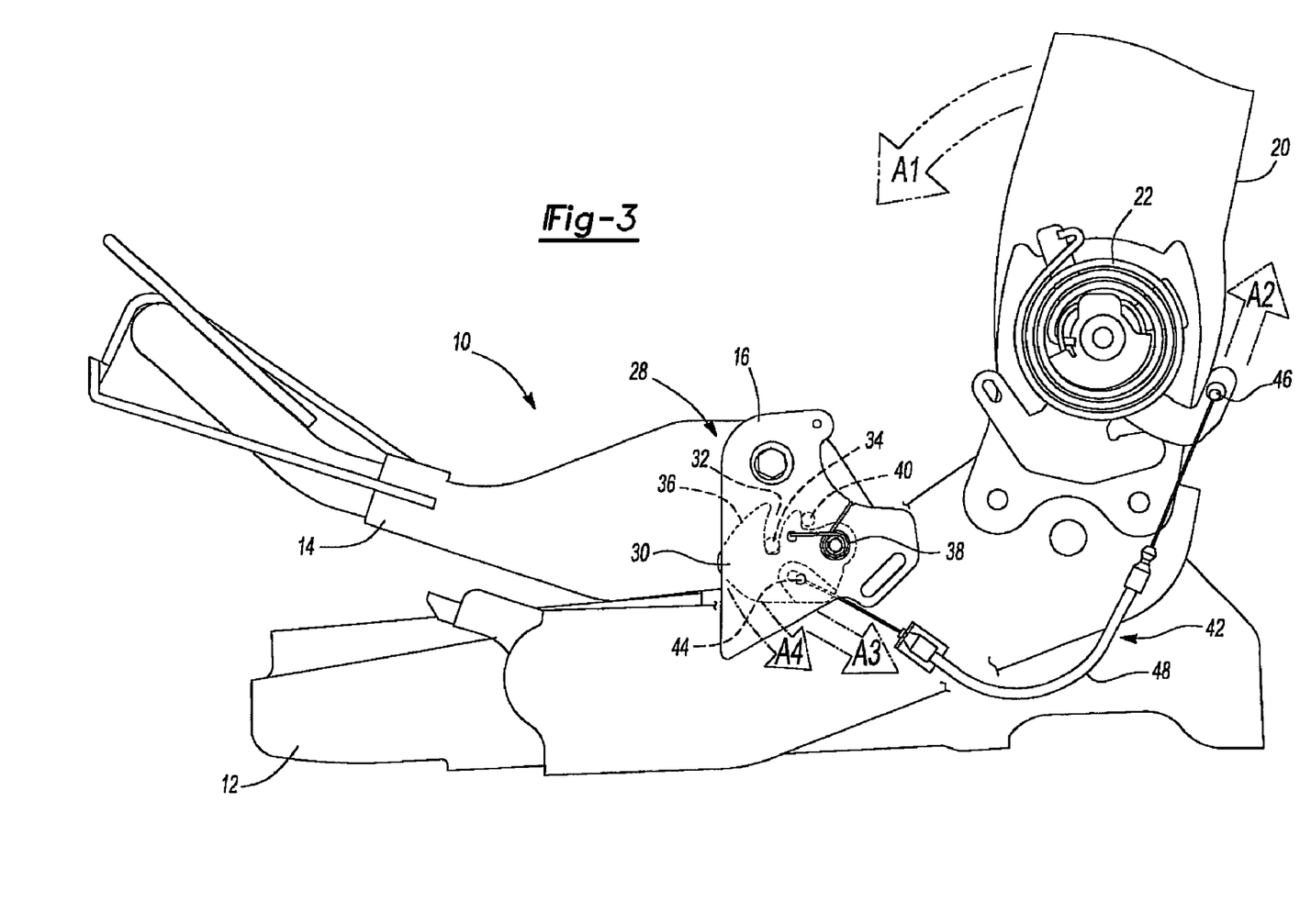
FIG. 3 is a side elevational view of the seat assembly showing the seat cushion in the seated position, the seat back in the seated position, and the latch in the engaged position.

In order to facilitate a better understanding of the principals associated with the inventive seat assembly, the operation of converting the seat assembly 10 from a seated position to a stowed position and back will now be described. As seen in FIG. 3, the seat assembly is in a seated position, with the seat cushion 14 locked in the seated position, the seat back locked in the seated position, and the latch 30 in the engaged position.

Upon actuation of lever 24 the seat back latch is released and the seat back 20 is unlocked from the seated position. Seat back biasing mechanism 22, no longer restrained by the seat back latch, biases the seat back 20 towards the stowed position in the direction of A1. The seat back end 46 of cable 42 is pulled, by the movement of the seat back 20, in the direction of A2. Consequently, the cable 42 and the latch end 44 are pulled in the direction of A3. The force exerted by the latch end 44 on the latch 30 overcomes the biasing force of the latch biasing mechanism 38, and the latch 30 is pulled from the engaged position towards the disengaged position in the direction of A4.

Figure 4:
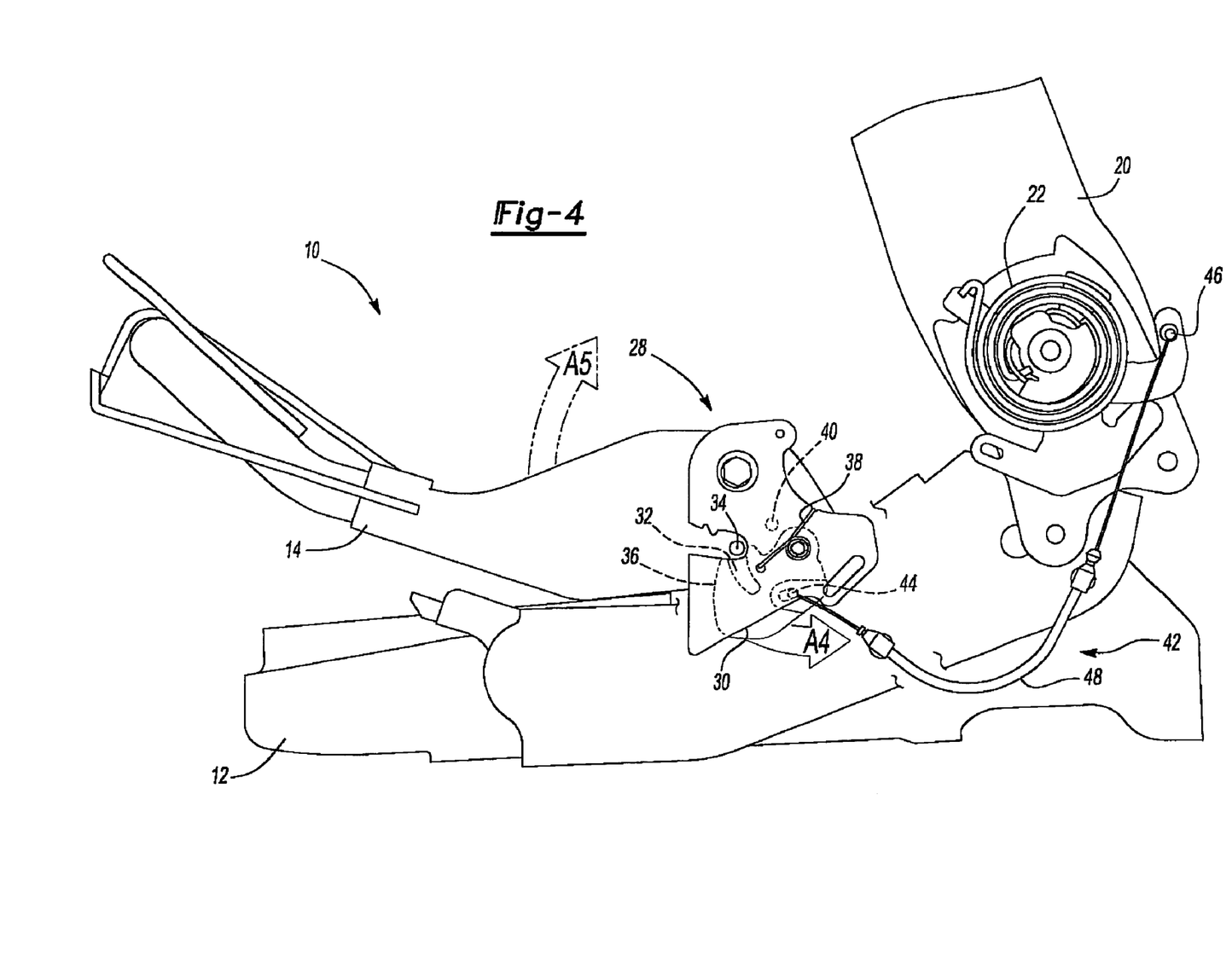
FIG. 4 is a side elevational view of the seat assembly showing the seat cushion in the seated position, the seat back in the stowed position and the latch in the disengaged position.

As seen in FIG. 4, movement of the latch 30 in the direction of A4 (i.e. from the engaged position to the disengaged position), disengages the retention member 34 from the elongated slot 32, thereby unlocking the seat cushion 14 from the seated position. Upon movement of the latch 30 from the engaged position to the disengaged position, the seat cushion biasing mechanism 26 is no longer restrained by the engagement of the elongated slot 32 and the retention member 34, and biases the seat cushion 14 in the direction of A5 towards the stowed position, as seen in FIG. 4.

As such, the seat assembly 10 provides a passenger with the ability to move the seat assembly from a seated position, with the seat cushion 14 and the seat back 20 both in the seated position, to the stowed position, with the seat cushion 14 and the seat back 20 both in the stowed position, through the actuation of only the lever 24.

Referring now to FIG. 5, to return the seat assembly 10 to the seated position a passenger first pushes the seat back 20 in the direction of A6 with enough force to overcome the force of the seat back biasing mechanism 22 until the seat back latch locks the seat back 20 in the seated position. When the seat back 20 is returned to the seated position, the cable 42 slackens due to the movement of the seat back end 46 in the direction of A7. Consequently, the latch biasing mechanism 38 is no longer restrained by the force exerted on the latch 30 by the latch end 44 of the cable 42 and, as such, biases the latch 30 towards the engaged position in the direction of A8.

Figure 6A:
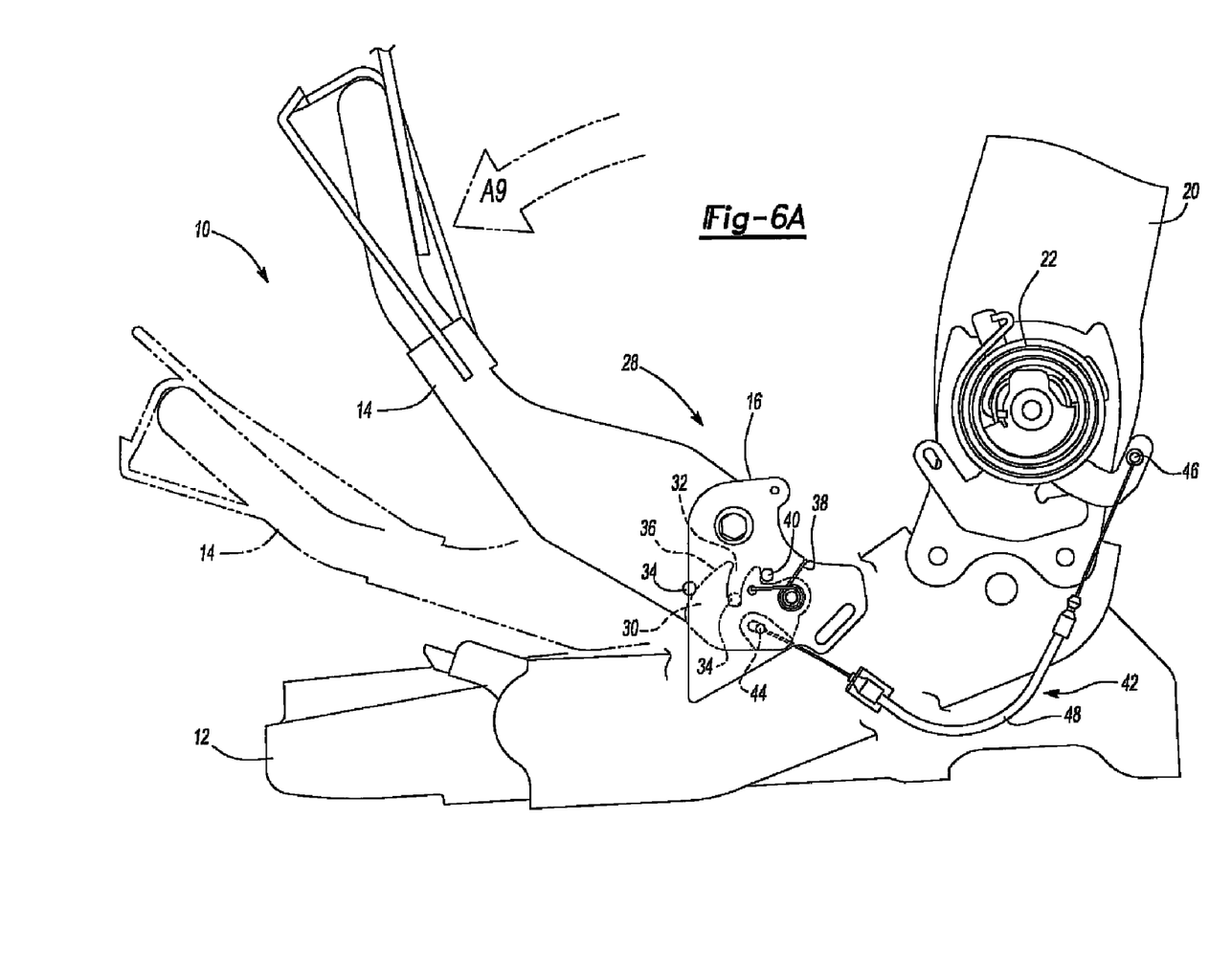
FIG. 6A is a side elevational view of the seat assembly showing the movement of the seat cushion from the stowed position to the seated position (in ghost), the seat back in the seated position, and the latch in the engaged position.
Figure 6B:
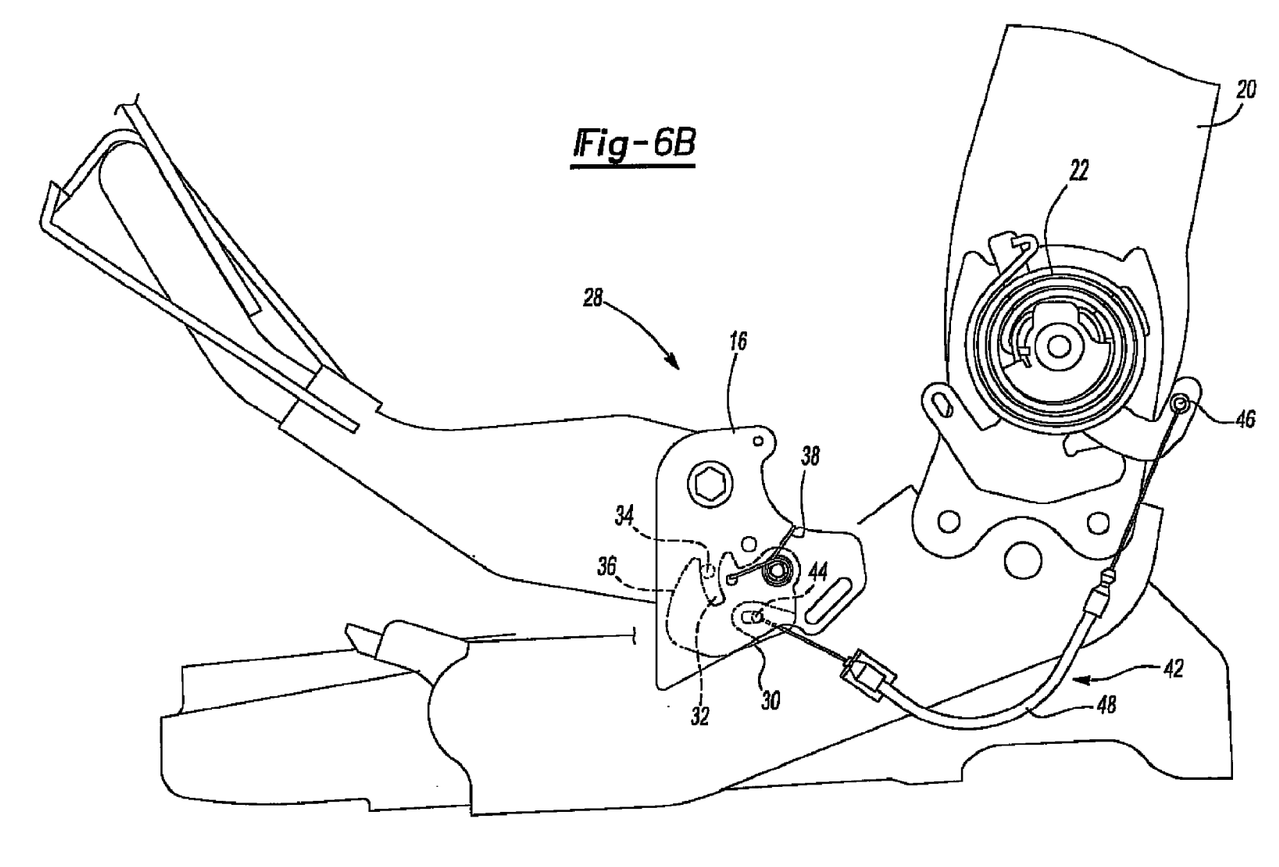
FIG. 6B is a side elevational view of the seat assembly showing the seat cushion in the intermediate position, the seat back in the seated position and the latch latching engaged with the retention member.

As seen in FIG. 6A, the seat back 20 is locked in the seated position and the latch 30 is in the engaged position. To return the seat cushion 14 to the seated position, a passenger must push the seat cushion 14 in the direction of A9 with enough force to overcome the biasing force of seat cushion biasing mechanism 26 until the seat cushion 14 is locked in the seated position, as seen in ghost. During the movement of the seat cushion 14 from the stowed position to the seated position, the latch 30, specifically the elongated slot 32, will cinchingly engage the retention member 34 to retain the seat cushion 14 at the intermediate position, as best seen in FIG. 6B. At this point the latch 30 will prevent the passenger from moving the seat cushion 14 towards the stowed position, however, movement of the seat cushion 14 towards the seated position is unimpeded.

Figure 7A:
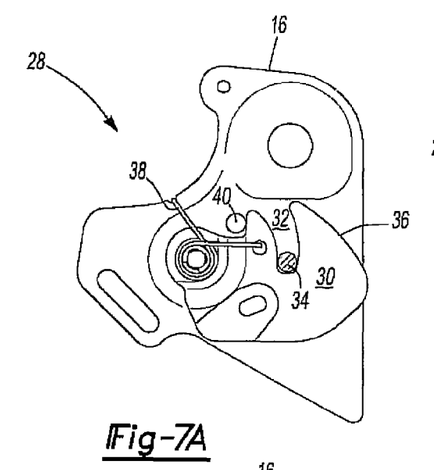
FIGS. 7A-7F are a partial side elevational view of the locking mechanism showing the movement of the latch and the retention member during a cycle of moving the seat assembly from the seated position to the stowed position and back to the seated position.

Referring to FIGS. 7A-7F, the engagement of the retention member 34 and the latch 30 upon movement of the seat assembly 10 between the seated position to the stowed position will now be discussed. FIG. 7A depicts the latch 30 in the engaged position and location of the retention member 34 when the seat cushion 14 is in the seated position. The seat cushion 14 is locked in the seated position when the retention member 34 is fully inserted into elongated slot 32. The retention member 34 is cinched into the elongated slot 32, due to its arcuate shape, such that movement of the retention member 34, and consequently the seat cushion 14, towards the stowed position is prevented.

Figure 7B:
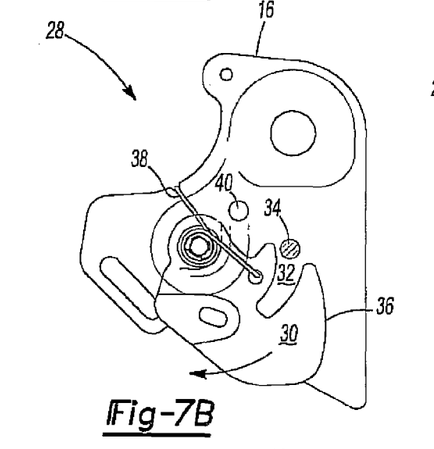

In FIG. 7B latch 30 is depicted in the disengaged position due to the movement of the seat back 20 from the seated position to the stowed position. Upon movement of the latch 30 towards the disengaged position, the retention member 34 is no longer cinched by the elongated slot 32 and the seat cushion biasing mechanism 26 will bias the seat cushion 14 towards the stowed position.

Figure 7C:
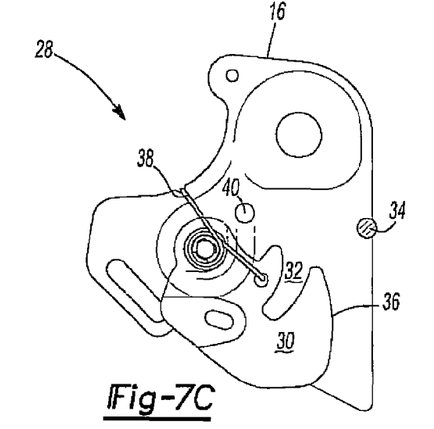
Figure 7D:
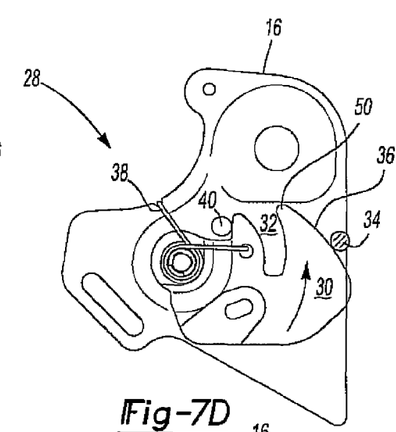
Figure 7E:
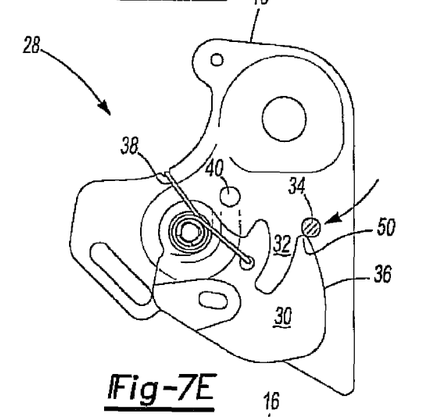
Figure 7F:
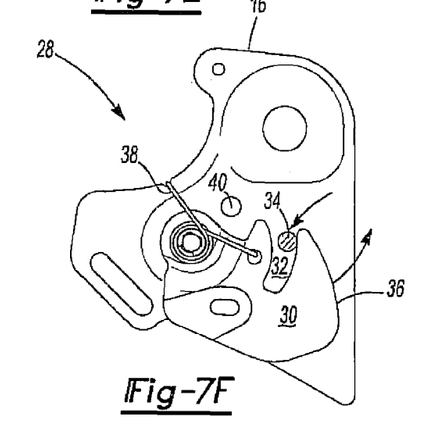

FIG. 7C shows seat cushion 14 in the stowed position and the seat back 20 in the stowed position. Upon movement of the seat back 20 to the seated position, the latch 30 will return to the engaged position, as seen in 7D, and the retention member 34 will contact the guide edge 36 of the seat cushion. The movement of the seat cushion 14 from the stowed position towards the seated position, causes the retention member 34 to travel along the guide edge 36 towards the elongated slot 32 as the latch 30 is moved towards the disengaged position due to the force exerted by the retention member 34 on the guide edge 36 which exceeds the biasing force of the latch biasing mechanism 38. Referring to FIG. 7E, as the retention member 34 passes the connection point 50 between the guide edge 36 and the elongated slot 32, the cam edge of the elongated slot 32 will cinch the retention member 34 thereby automatically locking the seat cushion 14, as shown in FIG. 7F.

The point at which the retention member 34 crosses the connection point 50 from the guide edge 36 to the elongated slot 32, the seat cushion 14 is at an intermediate position between the stowed position and seated position. Movement of the seat cushion 14 from the intermediate position towards the stowed position is prevented due to the cinching effect the cam angle of the elongated slot 32 has on the retention member 34. However, movement of the seat cushion 14 from the intermediate position towards the seated position is unimpeded as the retention member 34 travels farther into the elongated slot 32 and the latch 30 will move towards the engaged position until the seat cushion 14 is locked in the seated position.

The invention has been described in an illustrative manner. It is, therefore, to be understood that the terminology used is intended to be in the nature of words of description rather than of limitation. Many modifications and variations of the invention are possible in light of the above teachings. Thus within the scope of the appended claims the invention may be practiced other than as specifically described.

It is claimed:

1. A seat assembly for supporting an occupant in a passenger compartment of a vehicle having a floor, said seat assembly comprising:
   a base frame mounted to the floor of the vehicle;
   a seat cushion pivotally coupled to said base frame for movement between a seated position, a raised stowed position, and an intermediate position between said seated position and said raised stowed position, said seat cushion having an outwardly extending retention member; and
   a locking mechanism having a latch pivotally mounted to said base frame, said latch having an elongated slot dimensioned to receive said retention member to lock said seat cushion in said seated position, and said elongated slot having an arcuate shape that cinches said retention member within said elongated slot to retain said seat cushion at said intermediate position such that movement of said seat cushion from said intermediate position towards said stowed position is prevented while movement of said seat cushion from said intermediate position towards said seated position is unimpeded.

2. The seat assembly of claim 1 wherein said latch is pivotally mounted to said base frame for movement between an engaged position and a disengaged position, said elongated slot dimensioned to receive said retention member to prevent movement of said seat cushion from said intermediate position towards said stowed position, and to lock said seat cushion in said seated position when said latch is in said engaged position and said seat cushion is in said seated position.

3. The seat assembly of claim 2, wherein said latch has an exterior guide edge and wherein said retention member contacts said guide edge when said latch is in said engaged position and said seat cushion is in said stowed position.

4. The seat assembly of claim 3, wherein upon movement of said seat cushion from said stowed position towards said seated position, said retention member travels along said guide edge towards said elongated slot while pushing said latch from said engaged position towards said disengaged position until said elongated slot cinchingly engages said retention member when said seat cushion is in said intermediate position.

5. The seat assembly of claim 4, wherein upon the engagement of said retention member with said elongated slot, movement of said seat cushion from said intermediate position towards said seated position pushes said retention member farther into said elongated slot and wherein said latch moves towards said engaged position until said seat cushion is in said seated position and said latch is in said engaged position thereby locking said seat cushion in said seated position.

6. The seat assembly of claim 4, further comprising:
a seat back pivotally coupled to said base frame for movement between a seated position and a stowed position; and
a cable having a first end attached to said latch and a second end opposite said first end attached to said seat back such that movement of said seat back from said seated position to said stowed position moves said latch from said engaged position to said disengaged position.

7. The seat assembly of claim 6, wherein when said seat cushion is locked in said seated position, movement of said seat back from said seated position to said stowed position moves said latch from said engaged position to said disengaged position wherein said retention member disengages from said elongated slot to unlock said seat cushion from said seated position.

8. The seat assembly of claim 7, further comprising a seat cushion biasing mechanism attached to said seat cushion to bias said seat cushion towards said stowed position such that upon disengagement of said retention member from said elongated slot said seat cushion is automatically moved to the stowed position due to the biasing force of said seat cushion biasing member.

9. The seat assembly of claim 8, further comprising a latch biasing mechanism attached to said latch to bias said latch towards said engaged position such that upon movement of said seat back to said stowed position said cable overcomes the biasing force of said latch biasing member to move said latch from said engaged position to said disengaged position and wherein upon movement of said seat back from said stowed position to said seated position said latch is moved from the disengaged position to said engaged position due to the biasing force of said latch biasing member.

10. A seat assembly for supporting an occupant in a passenger compartment of a vehicle having a floor, said seat assembly comprising:
a base frame attached to the floor of the vehicle, said base frame having a first bracket and a second bracket;
a seat back pivotally mounted to said base frame for movement between a seated position and a stowed position;
a seat cushion pivotally mounted between said first bracket and said second bracket for movement between a seated position, a raised stowed position, and an intermediate position between said seated position and said stowed position;
a retention member extending outwardly from said seat cushion, such that said retention member travels along a curved path between said stowed position and said seated position of said seat cushion;
a latch pivotally mounted to said first bracket for movement between an engaged position and a disengaged position, said latch having an elongated slot dimensioned to receive said retention member to lock said seat cushion in said seated position when said latch is a said engaged position and said seat cushion is in said seated position;
a latch biasing mechanism attached to said latch to bias said latch towards said engaged position;
a seat cushion biasing mechanism connected to said seat cushion and said second bracket to bias said seat cushion towards said stowed position; and
a cable having a first end attached to said seat back and a second end opposite said first end attached to said latch;
wherein upon movement of said seat back from said seated position to said stowed position said cable releases said retention member to unlock said seat cushion from said seated position, said seat cushion biasing mechanism biases said seat cushion from said seated position to said stowed position,
wherein upon movement of said seat back from said stowed position to said seated position said cable slackens, and said latch biasing mechanism biases said latch to said engaged position, and wherein said elongated slot has an arcuate shape that cinches said retention member within said elongated slot to retain said seat cushion in said intermediate position such that movement of said seat cushion from said intermediate position towards said stowed position is prevented while movement of said seat cushion from said intermediate position towards said seated position is unimpeded.

11. The seat assembly of claim 10, wherein said latch has an exterior guide edge, said retention member contacts said guide edge when said latch is in said engaged position and said seat cushion is in said stowed position, and wherein upon movement of said seat cushion from said stowed position towards said seated position said retention member pushes said latch against the bias force of said latch biasing mechanism while traveling along said guide edge until said elongated slot cinchingly engages said retention member when said seat cushion is in said intermediate position.

12. The seat assembly of claim 10, wherein said arcuate shape of said elongated slot is a cam angle ranging between 3 degrees and 6 degrees.

13. The seat assembly of claim 10, wherein said first bracket and said second bracket are formed integral with said base frame.

14. The seat assembly of claim 10, wherein said cable is a Bowden cable having a housing with a first end attached to said base frame and a second end opposite said first end attached to said base frame.

15. The seat assembly of claim 10, wherein said first bracket includes a stop member to restrict said latch biasing mechanism from moving said latch beyond said engaged position.

16. The seat assembly of claim 10, wherein said seat cushion biasing mechanism is a clock spring.

17. The seat assembly of claim 10, wherein said retention member has a diameter between 8 millimeters and 3.5 millimeters.

\* \* \* \* \*

UNITED STATES PATENT AND TRADEMARK OFFICE
CERTIFICATE OF CORRECTION

| | | |
|---|---|---|
| PATENT NO. | : 8,104,834 B2 | Page 1 of 1 |
| APPLICATION NO. | : 12/430263 | |
| DATED | : January 31, 2012 | |
| INVENTOR(S) | : Peter James Moegling et al. | |

It is certified that error appears in the above-identified patent and that said Letters Patent is hereby corrected as shown below:

At column 8, claim number 10, line number 1, after is, insert --in--.

Signed and Sealed this
Thirty-first Day of July, 2012

David J. Kappos
*Director of the United States Patent and Trademark Office*